June 16, 1953     S. ZASLAVSKY ET AL     2,642,494
MODE SUPPRESSING COUPLING FOR CAVITY WAVEMETERS
Filed May 26, 1948
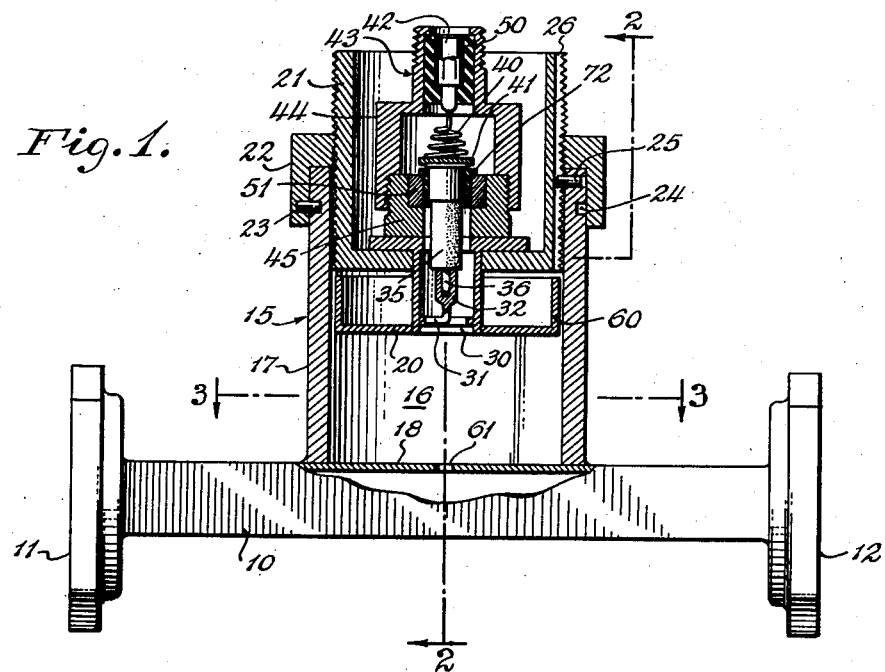
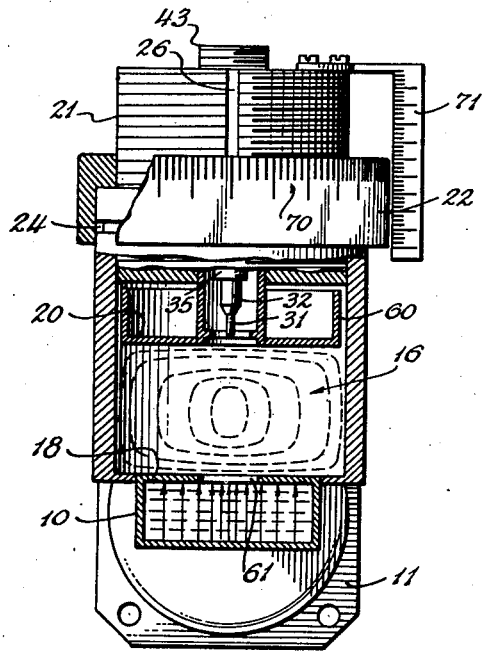
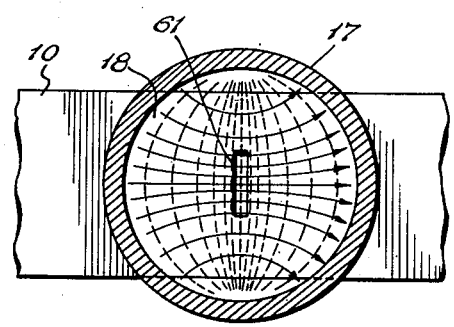
INVENTORS
MARTIN ZANICHKOWSKY
SAM ZASLAVSKY
BY
Paul B. Hunter
ATTORNEY Patented June 16, 1953

2,642,494

UNITED STATES PATENT OFFICE 2,642,494

MODE SUPPRESSING COUPLING FOR CAVITY WAVEMETERS

Sam Zaslavsky, Jackson Heights, and Martin Zanichkowsky, Brooklyn, N. Y., assignors to The Sperry Corporation, Great Neck, N. Y., a corporation of Delaware Application May 26, 1948, Serial No. 29,367

1 Claim. (Cl. 178—44)

This invention relates to ultra high frequency measuring equipment and particularly concerns itself with wavemeters of the cavity resonator type.

In the measurement of the wavelength of ultra high frequency energy the use of a cavity resonator whose resonant frequency is manually variable has been found to be effective. In general such cavity resonators have been of cylindrical cross-section having a movable end wall. In such cases, energy whose wavelength it is desired to measure is introduced into the cavity and the movable wall is adjusted until maximum energy is indicated by means of a pick-up element and conventional indicating means. This indication occurs when the physical length measured between the fixed end wall and the variable positioned end wall equals approximately a half wavelength of the introduced energy measured in a cylindrical wave guide of the same dimension when operated in the same mode.

In the past, several difficulties have been encountered which make such wavelength measurements difficult over a broad band of operating frequencies. First, in many cases it is possible for the resonator to support more than one mode of oscillation. As a result, ambiguities tend to be introduced because the wavelength measured in the resonator varies with mode of oscillation. Secondly, with the conventional output coupling arrangement through the side wall of the cavity resonator, the output observed on the indicating device varies in amplitude according to the frequency of energy whose wavelength is being measured.

It is an object of the present invention, therefore, to provide a cavity resonator type wavemeter which minimizes ambiguities in readings due to multiple mode operation.

Still another object of the present invention is to provide a cavity resonator type wavemeter whose input coupling mechanism excites but a single mode of oscillation in the cavity resonator.

It is a further object of the present invention to provide a cavity resonator type wavemeter whose output indication is relatively constant over a broad band of frequencies.

Yet another object of the present invention is to provide a cavity resonator type wavemeter having an output coupling mechanism which discriminates against undesired modes of oscillation in the cavity resonator.

Briefly, the present invention provides a cavity resonator having an input coupling mechanism which excites the resonator so that only three modes of oscillation are possible. One of these modes can occur at but a single frequency in the band of desired operating frequencies and is not greatly excited by the input coupling mechanism utilized. The second of these three modes can propagate in the cavity for only a very small portion of the operating band, but likewise is not greatly excited by the input coupling mechanism utilized. The third or desired mode propagates at all frequencies in the desired operating range. Furthermore, the input coupling mechanism utilized excites this mode at all frequencies in the desired operating range. The operating range of the wavemeter is limited in the desired mode only by the practical operating range of the wave guide to which it is coupled.

In addition to the selective nature of the input coupling mechanism, the output coupling mechanism is of such a nature and is so oriented that it discriminates against all but the desired mode. As a result, the output indications are, in general, due only to the single preferred mode of oscillation in the cavity.

This operation can be understood by considering a cylindrical cavity resonator which is excited in the $TE_{111}$ mode. This mode can be excited in the cavity to the exclusion of virtually all other modes by a narrow slot centered in one end wall. Such a narrow slot provides virtually no electric coupling. The diameter of the cavity is chosen so that the only other modes over the entire operating range that are possible are the $TM_{011}$ and the $TE_{211}$. The $TM_{011}$ mode can exist at only one frequency in the operating range and is necessarily at a very low level because of the form of the coupling slot which provides little or no electric coupling. In addition the effect of the $TM_{011}$ mode is further reduced in the reading of the indicating device by the central location of the output coupling mechanism.

Likewise, the $TE_{211}$ mode is not coupled by a centrally located input coupling slot, though it may arise due to irregularities in the cavity or reradiation from output coupling mechanisms that take such forms as loops which are necessarily asymmetrical. The effect of the output coupling loop can be minimized, however, by the common device of locating it a short distance inside the output line, thus providing considerable reactive attenuation between the loop and the cavity. In addition, when the coupling loop is located in the center of the movable end wall, or tuning plunger, it is oriented symmetrically with respect to the TE$_{211}$ mode and is at a point of minimum magnetic field strength for that mode.

On the other hand, the coupling slot provides excellent excitation for the desired TE$_{111}$ mode and the coupling element is located at the region of maximum magnetic field strength.

The above features and objects of this invention will become more evident by considering the following description taken in connection with the drawing in which, Fig. 1 is an elevation view, partially in section, of the wavemeter mounted on a section of wave guide transmission line;

Fig. 2 is a partial section view taken along line 2—2 of Fig. 1; and

Fig. 3 is a partial section view taken along line 3—3 of Fig. 1.

Referring to Fig. 1 in detail, energy whose frequency it is desired to measure is transmitted through wave guide section 10 which has conventional connectors 11 and 12 at either end for connection into a wave guide transmission system. Mounted on top of wave guide section 10 and rigidly connected therewith is wavemeter 15 having cavity resonator 16 formed by cylindrical member 17 attached to the upper wall 18 of wave guide 10 and movable end wall 20. Movable end wall 20 is supported by externally threaded barrel member 21 which is longitudinally adjusted in cylindrical member 17 by internally threaded rotating member 22. The longitudinal position of threaded member 22 is maintained with respect to cylindrical member 17 by internally projecting pin 23 which rides in slot 24 milled or formed in the outer wall of cylindrical member 17 near its upper or free end. A second pin 25 projects inwardly from cylindrical member 17 and rides in groove 26 formed longitudinally along the outer face of barrel member 21. This mechanism constrains barrel member 21 to move longitudinally with respect to cylindrical member 17 as member 22 is rotated. Movable face 20 is provided with a centrally located aperture 30 in which coupling loop 31 is supported by having one end thereof terminating on and rigidly connected to movable wall 20. Coupling loop 31 may be slightly recessed from the face of end wall 20 as shown so as to minimize electrical asymmetry in the cavity. The free end of coupling loop 31 tapers to an expanded diameter portion 32 oriented along the axis of cylindrical member 17. Detector unit 35 is supported by coupling loop 31 and has a projecting stud 36 which fits snugly into an axial bore in expanded diameter portion 32. The longitudinal position of detector unit 35 is suitably selected and is maintained by spring member 40 and cap 41 which fits over the upper end of detector unit 35. Spring member 40 terminates on conductor 42 which forms the center conductor of an output coaxial coupling unit 43. The outer conductor of this coupling unit is formed by cylindrical member 44 which threadedly engages mounting member 45 rigidly connected to barrel member 21. Dielectric washer 50 serves to maintain the fixed coaxial relationship of inner conductor member 42 with outer conductor 44. In addition, metal member 51 aids in providing mechanical stability for detector unit 35 and at the same time with dielectric separator 72 provides a conventional ultra high frequency by-pass condenser for the unit.

A conventional quarter-wave choke is provided by cylindrical member 60 mounted on moving wall 20. Transverse slot 61 in upper wall 18 of wave guide 10 has its center on the longitudinal axis of cylindrical member 17.

The details of slot 61 can be seen in Figs. 2 and 3, which are section views of Fig. 1 taken along lines 2—2 and 3—3 thereof, respectively. As is seen, slot 61 extends along the width of upper wall 18 of wave guide section 10. The length of slot 61 should be sufficient to provide enough coupling to give an output indication at all frequencies in the operating band.

For calibration purposes, scale 70, seen in Fig. 2, is provided on the outer face of rotating member 22. This scale cooperates with adjacent scale 71 rigidly fixed to barrel member 21 and movable therewith. The instrument may be calibrated to measure wavelength or frequency depending upon the desired use.

In operation, energy is introduced into resonator 16 by slot 61 which couples to the field existing in wave guide 10. As designed, wave guide 10 operates in the dominant or TE$_{01}$ mode. Reference to Fig. 2 shows the orientation of the electric and magnetic fields in this mode. Transverse slot 61 magnetically couples the transverse magnetic field of the guide into resonator 16 in such a manner that resonator 16 operates in the TE$_{111}$ mode. The electric and magnetic fields of such a mode are shown diagrammatically in Figs. 2 and 3. In Fig. 2, it will be seen that one half wavelength of a sinusoidal distribution of the field exists along the axis of cylindrical resonator 16 so that the dimension between movable face 20 and wall 18 represents approximately a half wavelength in the cavity of the coupled energy. Reference to Fig. 3, which is a cross section taken along line 3—3 of Fig. 1, shows the plan view of resonator 16. The electric and magnetic field of the induced TE$_{111}$ mode is also diagrammatically indicated in this figure. It will be noted that in this mode the electric field has a plane of polarization which is normal to the transverse slot 61. Coupling loop 31 is in turn normal to the slot 61, and is therefore subject to the maximum excitation by the magnetic field. It should be noted that as the frequency of the energy to be measured is changed the field configuration maintains the same relationship so that loop 31 is always located at the point of maximum magnetic field. Therefore, maximum output indication is achieved at all operating frequencies merely by adjusting the movable wall 20 until the resonator 16 has the proper axial length. Thus the output is relatively uniform over the entire band of operating frequencies.

It will be seen that since the coupling mechanism between wave guide 10 and resonator 16 is a transverse slot virtually no electric coupling exists. As a result the TE$_{211}$ mode which has axial symmetry is not induced. In addition, the coupling loop 31 is located at a point of minimum magnetic field for this mode, so that even in the event that the TE$_{211}$ mode is created at some frequencies due to irregularities in the cavity or reradiation from the output coupling loop 31, the pick-up by output coupling loop 31 is minimized.

In like manner there is little likelihood of the TM$_{011}$ mode being created since the coupling mechanism is a slot having little or no electric coupling. Also, as with the TE$_{211}$ mode, the pick-up loop is so disposed so as to provide minimum pick-up of energy in this mode.

Thus it can be seen that the present invention provides a cylindrical cavity resonator wavemeter which will operate efficiently over a broad band of frequencies utilizing the $TE_{111}$ mode. Since the output coupling loop 31 is located in the center of the movable end wall 20, it receives maximum excitation while measuring energy of any wavelength as long as the cavity is operating in the desired $TE_{111}$ mode. Therefore, the output indication will be relatively constant over the operating range of the wavemeter. In addition, due to the specific input coupling means little or no oscillations may occur in the undesired $TM_{011}$ and the $TE_{211}$ modes. Furthermore, due to the specific orientation and location of the output coupling loop the presence of such modes will not be indicated in the output metering mechanism.

Thus there is provided, in accordance with the teachings of this invention, a wavemeter of the cavity resonator type which supplies an output indication which is uniform over a relatively broad band of operating frequencies, and which furnishes wavelength measurements that are free of ambiguities due to multiple mode operation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

A cylindrical cavity resonator wave meter having a first end wall and a second end wall, one of said walls being movable toward and away from the other, said movable wall being keyed to the cylindrical wall of the resonator to prevent relative rotation therebetween, said movable wall portion being externally threaded, a rotatable threaded nut longitudinally fixed on the cylindrical wall of said resonator and threadedly engaging said movable wall portion, said first end wall having an elongated slot centrally located therein for admitting electromagnetic energy to said resonator to excite it in the $TE_{111}$ mode, means including a coupling loop substantially centrally located in said second end wall and fixedly oriented in a plane perpendicular to the longitudinal axis of said elongated slot for selectively responding to energy at the resonant frequency of said resonator in the $TE_{111}$ mode coupled through said slot, said coupling loop being fixed in its orientation about the axis of said resonator but being movable along the axis with movement of said movable wall in response to angular adjustment of said nut.

SAM ZASLAVSKY.
MARTIN ZANICHKOWSKY.

References Cited in the file of this patent

UNITED STATES PATENTS

| Number | Name | Date |
|---|---|---|
| 2,404,226 | Gurewitsch | July 16, 1946 |
| 2,423,506 | Landon | July 8, 1947 |
| 2,488,378 | Coltman | Nov. 15, 1949 |
| 2,503,256 | Ginzton et al. | Apr. 11, 1950 |
| 2,558,021 | Varian | June 26, 1951 |
| 2,558,385 | Purcell | June 26, 1951 |

FOREIGN PATENTS

| Number | Country | Date |
|---|---|---|
| 895,164 | France | Jan. 17, 1945 |